US008285900B2

(12) United States Patent
Gratz et al.

(10) Patent No.: US 8,285,900 B2
(45) Date of Patent: Oct. 9, 2012

(54) METHOD AND APPARATUS FOR CONGESTION-AWARE ROUTING IN A COMPUTER INTERCONNECTION NETWORK

(75) Inventors: Paul Gratz, Austin, TX (US); Boris Grot, Austin, TX (US); Stephen W. Keckler, Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 7 days.

(21) Appl. No.: 12/372,556

(22) Filed: Feb. 17, 2009

(65) Prior Publication Data

US 2010/0211718 A1    Aug. 19, 2010

(51) Int. Cl.
G06F 13/00 (2006.01)
G06F 15/173 (2006.01)
G06F 11/00 (2006.01)
G01R 31/08 (2006.01)
G08C 15/00 (2006.01)
H04J 1/16 (2006.01)
H04J 3/14 (2006.01)
H04L 1/00 (2006.01)
H04L 12/26 (2006.01)
H04L 12/28 (2006.01)

(52) U.S. Cl. ........ 710/100; 709/238; 709/239; 709/240; 709/241; 709/242; 370/229; 370/230.1; 370/237; 370/238; 370/351

(58) Field of Classification Search .................. 710/100; 709/238–242; 370/229, 230.1, 237, 238, 370/351
See application file for complete search history.

(56) References Cited

U.S. PATENT DOCUMENTS

| | | | | |
|---|---|---|---|---|
| 4,873,517 A | * | 10/1989 | Baratz et al. | 370/236 |
| 4,931,941 A | | 6/1990 | Krishnan | |
| 5,390,173 A | * | 2/1995 | Spinney et al. | 370/401 |
| 5,398,012 A | * | 3/1995 | Derby et al. | 370/238 |
| 5,737,313 A | * | 4/1998 | Kolarov et al. | 370/234 |
| 5,920,697 A | * | 7/1999 | Masters et al. | 709/219 |
| 5,953,312 A | * | 9/1999 | Crawley et al. | 370/218 |
| 5,963,552 A | * | 10/1999 | Joo et al. | 370/395.32 |
| 6,212,188 B1 | * | 4/2001 | Rochberger et al. | 370/395.32 |
| 6,260,072 B1 | | 7/2001 | Rodriguez-Moral | |

(Continued)

FOREIGN PATENT DOCUMENTS

EP    912016 A2 *  4/1999

(Continued)

OTHER PUBLICATIONS

"NA9206436: New Routing Algorithm for Large Interconnected Networks", Jun. 1, 1992, IBM, IBM Technical Disclosure Bulletin, vol. 35, Iss. 1A, pp. 436-437.*

(Continued)

*Primary Examiner* — Faisal M Zaman
(74) *Attorney, Agent, or Firm* — Dorsey & Whitney LLP

(57) ABSTRACT

The present disclosure relates to an example of a method for a first router to adaptively determine status within a network. The network may include the first router, a second router and a third router. The method for the first router may comprise determining status information regarding the second router located in the network, and transmitting the status information to the third router located in the network. The second router and the third router may be indirectly coupled to one another.

13 Claims, 10 Drawing Sheets

U.S. PATENT DOCUMENTS

| | | | | |
|---|---|---|---|---|
| 6,272,548 | B1* | 8/2001 | Cotter et al. | 709/239 |
| 6,519,257 | B1* | 2/2003 | Brueckheimer et al. | 370/395.2 |
| 6,625,115 | B1* | 9/2003 | Ikeda et al. | 370/217 |
| 6,631,420 | B1* | 10/2003 | Li et al. | 709/242 |
| 6,829,220 | B1* | 12/2004 | Thorup et al. | 370/235 |
| 6,871,235 | B1* | 3/2005 | Cain | 709/239 |
| 6,990,103 | B1* | 1/2006 | Gollamudi | 370/395.31 |
| 7,020,717 | B1* | 3/2006 | Kovarik et al. | 709/229 |
| 7,047,292 | B1* | 5/2006 | Stewart et al. | 709/224 |
| 7,080,141 | B1* | 7/2006 | Baekelmans et al. | 709/224 |
| 7,173,906 | B2* | 2/2007 | Ravi et al. | 370/230 |
| 7,225,268 | B2* | 5/2007 | Watanabe | 709/238 |
| 7,251,215 | B1* | 7/2007 | Turner et al. | 370/231 |
| 7,260,635 | B2* | 8/2007 | Pandya et al. | 709/226 |
| 7,280,482 | B2* | 10/2007 | Heiner et al. | 370/238 |
| 7,281,259 | B2* | 10/2007 | Takagi et al. | 725/38 |
| 7,292,535 | B2* | 11/2007 | Folkes et al. | 370/238 |
| 7,418,517 | B2* | 8/2008 | Zeitler et al. | 709/238 |
| 7,430,622 | B1* | 9/2008 | Owen | 710/29 |
| 7,443,845 | B2* | 10/2008 | Gai et al. | 370/389 |
| 7,443,855 | B2* | 10/2008 | Epley | 370/392 |
| 7,457,860 | B2* | 11/2008 | Shang et al. | 709/223 |
| 7,464,239 | B2* | 12/2008 | Hwang et al. | 711/162 |
| 7,475,142 | B2* | 1/2009 | Sharma et al. | 709/226 |
| 7,496,680 | B2* | 2/2009 | Canright | 709/238 |
| 7,616,575 | B2* | 11/2009 | Padhye et al. | 370/252 |
| 7,633,865 | B2* | 12/2009 | Andrews et al. | 370/230 |
| 7,716,366 | B2* | 5/2010 | Regan et al. | 709/240 |
| 7,742,436 | B2* | 6/2010 | Carrillo et al. | 370/255 |
| 7,813,275 | B2* | 10/2010 | Yamada et al. | 370/230 |
| 7,843,843 | B1* | 11/2010 | Papp et al. | 370/252 |
| 7,898,981 | B1* | 3/2011 | Tran et al. | 370/254 |
| 7,978,611 | B2* | 7/2011 | Sierecki et al. | 370/238 |
| 7,978,612 | B2* | 7/2011 | Retana et al. | 370/238 |
| 8,072,951 | B2* | 12/2011 | Flammer et al. | 370/338 |
| 2002/0141427 | A1* | 10/2002 | McAlpine | 370/413 |
| 2002/0176359 | A1* | 11/2002 | Durinovic-Johri et al. | 370/229 |
| 2002/0186656 | A1* | 12/2002 | Vu | 370/229 |
| 2003/0005145 | A1* | 1/2003 | Bullard | 709/238 |
| 2003/0086421 | A1* | 5/2003 | Awsienko et al. | 370/387 |
| 2003/0108061 | A1* | 6/2003 | Black et al. | 370/447 |
| 2003/0137974 | A1* | 7/2003 | Kwan et al. | 370/352 |
| 2004/0049595 | A1* | 3/2004 | Sun et al. | 709/238 |
| 2004/0146007 | A1* | 7/2004 | Saadawi et al. | 370/238 |
| 2005/0007997 | A1* | 1/2005 | Morton et al. | 370/351 |
| 2005/0074003 | A1* | 4/2005 | Ball et al. | 370/389 |
| 2005/0243725 | A1* | 11/2005 | Wrenn et al. | 370/238 |
| 2005/0286464 | A1* | 12/2005 | Saadawi et al. | 370/328 |
| 2006/0047742 | A1* | 3/2006 | O'Neill et al. | 709/203 |
| 2006/0056426 | A1* | 3/2006 | Wakameda et al. | 370/401 |
| 2006/0085103 | A1* | 4/2006 | Smith et al. | 701/19 |
| 2006/0149851 | A1* | 7/2006 | Matsumoto et al. | 709/238 |
| 2006/0262772 | A1* | 11/2006 | Guichard et al. | 370/351 |
| 2007/0011351 | A1* | 1/2007 | Bruno et al. | 709/238 |
| 2007/0076622 | A1* | 4/2007 | Mukherjee | 370/252 |
| 2008/0056128 | A1* | 3/2008 | Joyce et al. | 370/230.1 |
| 2008/0056137 | A1* | 3/2008 | Ravindran et al. | 370/238 |
| 2008/0137620 | A1* | 6/2008 | Wang et al. | 370/337 |
| 2008/0232375 | A1* | 9/2008 | Hachiya et al. | 370/392 |
| 2008/0298249 | A1* | 12/2008 | Baker et al. | 370/238 |
| 2009/0106569 | A1* | 4/2009 | Roh et al. | 713/300 |
| 2010/0074101 | A1* | 3/2010 | Skalecki et al. | 370/221 |
| 2010/0075675 | A1* | 3/2010 | Yang et al. | 455/436 |

FOREIGN PATENT DOCUMENTS

| | | | |
|---|---|---|---|
| EP | 915592 A1 | * | 5/1999 |
| EP | 1978689 A1 | * | 10/2008 |
| JP | 04321127 A | * | 11/1992 |
| WO | WO 9840832 A2 | * | 9/1998 |
| WO | WO 2004109473 A2 | * | 12/2004 |

OTHER PUBLICATIONS

"NN9007110: Adaptive Load Sharing Strategy", Jul. 1, 1990, IBM, IBM Technical Disclosure Bulletin, vol. 33, Iss. 2, pp. 110-113.*

Yun-qing Fu,; Song-jian Wang,; Ming-yang Zhong,; , "Research on weighted link based routing protocol for wireless mesh network," Wireless, Mobile and Sensor Networks, 2007. (CCWMSNO7). IET Conference on , pp. 293-296, Dec. 12-14, 2007.*

Ramanujan, R.; Takkella, S.; Bonney, J.; Thurber, K.; , "Source-initiated adaptive routing algorithm (SARA) for autonomous wireless local area networks," Local Computer Networks, 1998. LCN '98. Proceedings., 23rd Annual Conference on , pp. 109-118, Oct. 11-14, 1998.*

Dally, William et al.; "Route Packets, Not Wires: On-Chip Interconnection Networks" *DAC* Jun. 2001, pp. 18-22.

Duato Jose; "A New Theory of Deadlock-Free Adaptive Routing in Wormhole Networks" IEEE, 1993.

Mullins, Robert et al.; "Low-Latency Virtual-Channel Routers for On-Ship Networks" IEEE, 2004.

Seo, Daeho et al.; "Near-Optimal Worst-case Throughout Routing for Two-Dimensional Mesh Networks" IEEE (2005).

Scott, Steven L.; "The Cray T3E Network: Adaptive Routing in a High Performance 3D Torus" HOT Interconnects IV Aug. 1996.

Singh, Arjun.; "Globally Adaptive Load-Balanced Routing on Tori" Computer Systems Laboratory, Stanford University, Mar. 2004.

Singh, Arjun.; Adaptive Channel Queue Routing on K-ary n-cubes SPAA, Jun. 2004.

Kim, Jongman.; "A Low Latency Router Supporting Adaptivity for On-Chip Interconnects" DAC, 2005.

Peh Li-Shiuan et al.; "A Delay Model and Speculative Architecture for Pipelined Routers" In Proceedings of the 7th International Symposium on High-Perfomance Computer Architecture, Jan. 22-24, 2001, Monterrey, Mexico, pp. 255-266.

Singh, et al., "Goal: A Load-Balanced Adaptive Routing Algorithm for Torus Networks", 30th Annual International Symposium on computer Architecture, IEEE 2003, pp. 194-205.

* cited by examiner

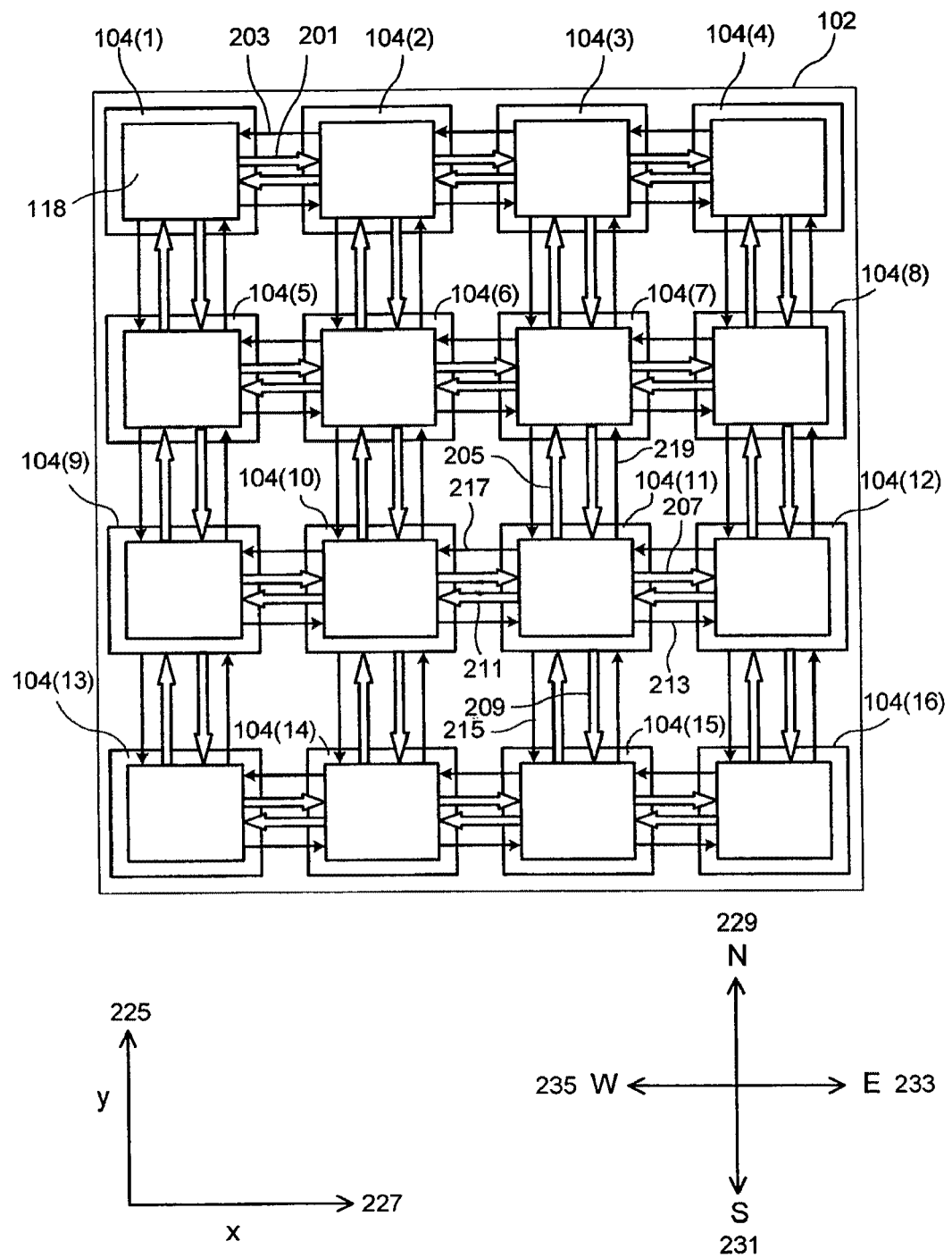
F I G. 2

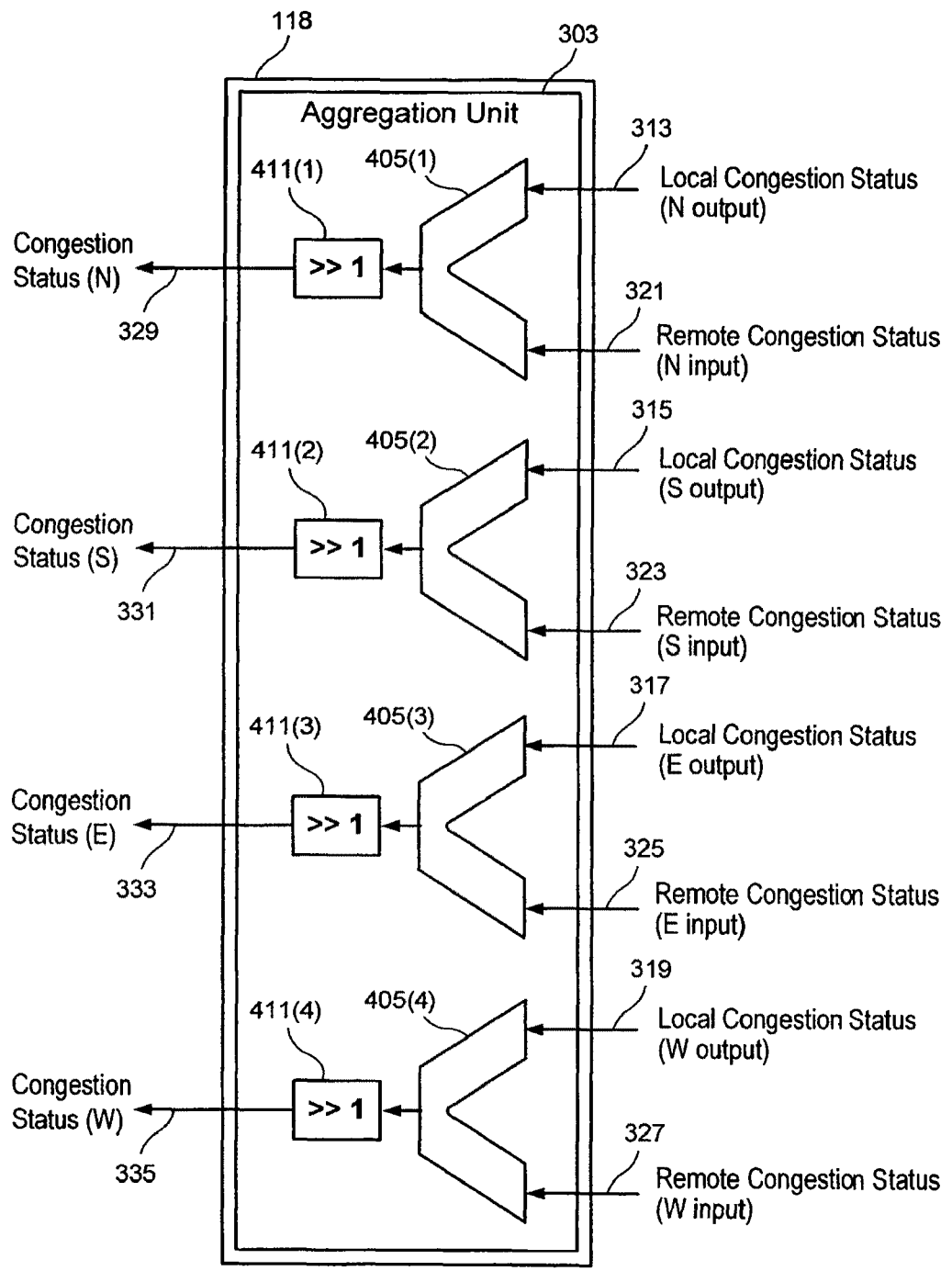
F I G. 5

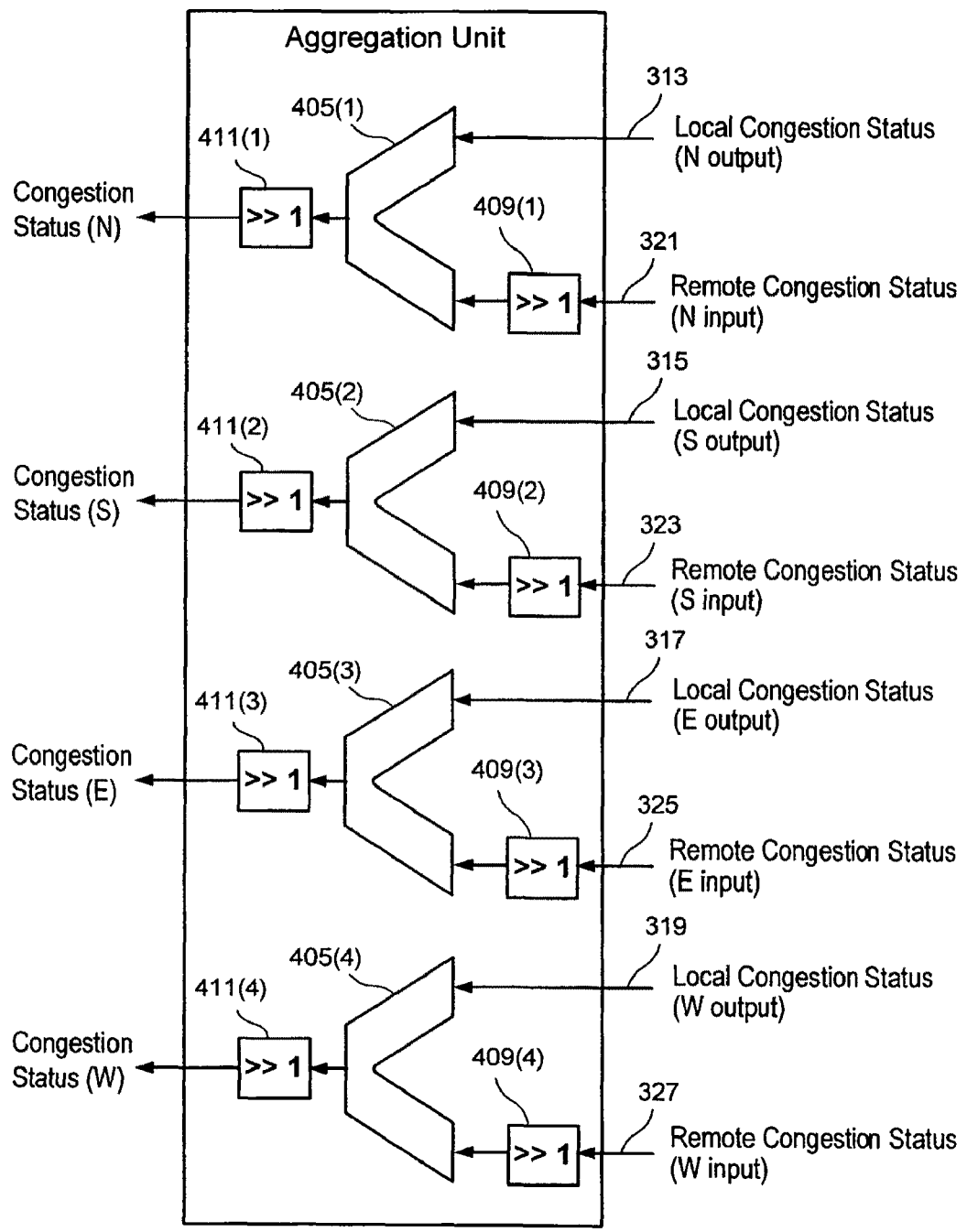
F I G. 6

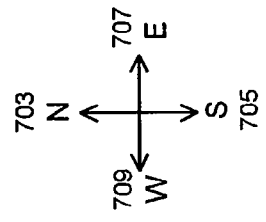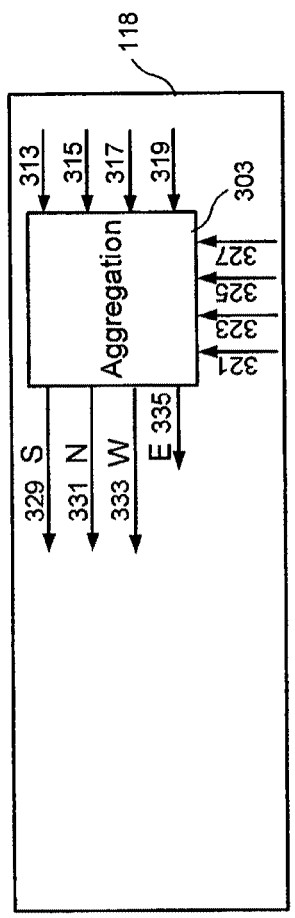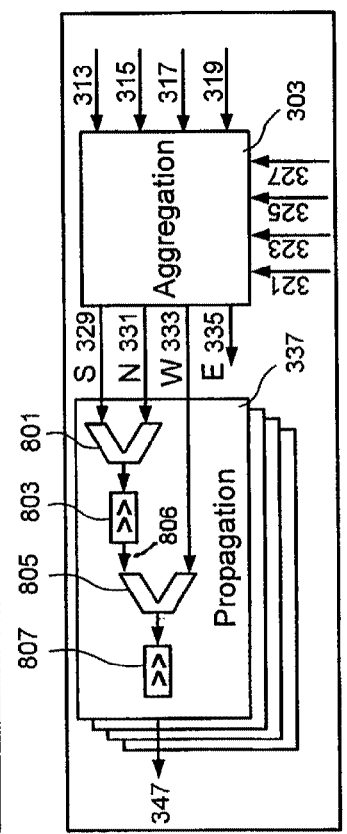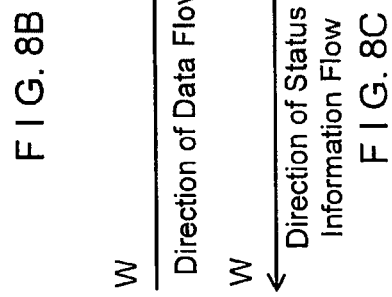
FIG. 8A
FIG. 8B
FIG. 8C

METHOD AND APPARATUS FOR CONGESTION-AWARE ROUTING IN A COMPUTER INTERCONNECTION NETWORK

STATEMENT REGARDING GOVERNMENT SPONSORED RESEARCH

This invention was made with government support under F33615-03-C-4106 awarded by the Air Force. The government has certain rights in the invention.

BACKGROUND

Chip-level multiprocessors combine two or more independent processing nodes on a single integrated circuit. These processing architectures have emerged as the leading replacement to complex systems of networked uniprocessors, and continue to grow in complexity and in size. Existing on-chip interconnects, such as networks-on-chip, can execute either static or adaptive routing algorithms to determine the route taken by a data packet through the network. Adaptive routing algorithms that provide flexibility with respect to route choice provide advantages over oblivious approaches that are unable to adapt to changes in the network.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 is a block diagram of an example of a multinodal array in a regional congestion awareness network;

FIG. 5 is a schematic diagram of an illustrative example of an aggregation module within the regional congestion awareness network;

FIG. 6 is a schematic diagram of another example of the aggregation module arrangement with the regional congestion awareness network;

FIGS. 8a-8c are schematic diagrams of examples of propagation modules in the example regional congestion awareness networks shown in FIGS. 7a-7c;

DETAILED DESCRIPTION

Figure 1:
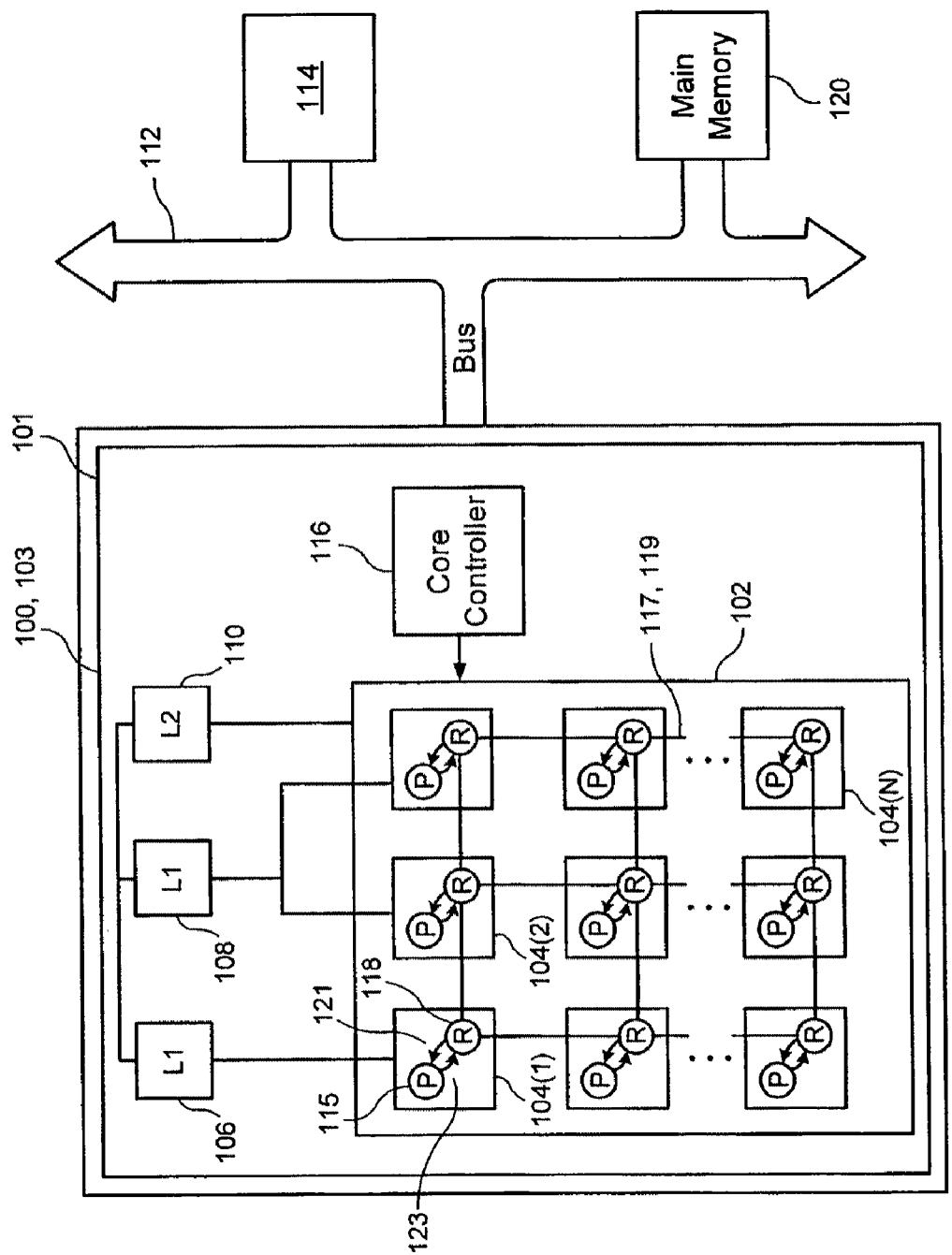
FIG. 1 is a block diagram of an illustrative example of a regional congestion awareness network.

The above-described figures include numbering to designate illustrated components within the drawings, including the following: Central Processing Unit (CPU) 101; the multinodal processor 103; a chip, or integrated circuit 100; resource 106; resource 108; processing nodes 104; shared level two cache 110; shared external bus 112; external component 114; main memory 120; data processing unit 115; core/node controller 116; routing device 118; communication channels 117 and 119; additional communication channels 121 and 123; a first group of data communication channels 201; a second group of status communication channels 203; routing device 118; data processing unit 115; outgoing data channels of node 104(11) 205, 207, 209 and 211; outgoing status channels of node 104(11) 213, 215, 217 and 219; horizontal dimension 227; vertical dimension 225; North 229; South 231; East 233; West 235; local status hardware unit 301; local status information 305 to 311; local congestion metrics 313 to 319; aggregation hardware unit 303; non-local status information 321 to 327; combined metrics 329 to 335; port preselection module 339; propagation module 337; outgoing status communication channels 341 to 347; route computation module 355; crossbar traversal module 359; virtual channel allocation module 357; data packet 361; input virtual channel 360; output virtual channel 362; selected output channel 364; input channels 360(1) to 360(v-1); crossbar switch 363; output data channel 364; left shifters 401, 403; assigned weights 407, 409; add function 405; right-shift function 411; axis of propagation 701; direction of data flow/East 707; direction of status flow/West 709; North 703; South 705; first combined metric 720, 724, 728; second combined metric 722,; horizontal dimension 750; vertical dimension 751; aggregated information from nodes located along North direction 720; aggregated status information from South nodes 722, 726, 730; aggregated status information from North nodes 720, 724, 728; total aggregated status information from the North, South, and East directions 760; Northeast quadrant 740; Southeast quadrant 770; first aggregated status information 711; second aggregated status information 713; first adding function 801; second add function 805; first right-shift by one function 803; second right-shift by one function 807; computed average 806; adder 809; shifter 811; first step 902, second step 903; third step 904; computer system 1000; processor 1001; step 1002; step 1004; step 1006; basic configuration 1101; computing device 1100; system memory 1120; processors 1110; memory bus 1130; level one cache 1111; level two cache 1112; registers 1114; memory controller 1115; node/core controller 1129; multimodal processing array 1113; operating system 1121; applications 1122; program data 1124; dashed line 1101; data storage devices 1150; bus/interface controller 1140; storage interface bus 1141; removable storage devices 1151; non-removable storage devices 1152; interface bus 1142; output devices 1160; graphics processing unit 1161; peripheral interfaces 1170; interface controller 1171; parallel interface controller 1172; I/O ports 1173; communication device 1180; network controller 1181; computing devices 1190.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Additionally, some well-known structures, circuits, techniques, and the like have not been described in detail, to avoid unnecessarily obscuring the disclosure.

In multinodal processing, data may be distributed to particular processing nodes as the data is read from memory, storage devices, external sensors, or other components of the computing environment, such as but not limited to, input-output (I/O) devices or other components connected to the Central Processing Unit (CPU) by buses. Data to be processed can be distributed to the processing nodes in many ways, such as through an on-chip interconnection network on a single-chip multiprocessor.

Existing routing procedures for on-chip networks may not efficiently route the data between the various processing nodes. For example, most of these networks can employ simple deterministic routing procedures, in which data packets follow a fixed, predetermined path from the source node to the destination nodes. Although these congestion-oblivious routing procedures may be simple to implement, they may be unable to balance network load because they are unable to adapt to changes in the network.

Adaptive, or congestion-aware routing procedures, attempt to address this shortcoming by routing around congested areas in the network, and better distributing traffic among the various routers to avoid congestion. These procedures have been successful in improving network performance in multi-chip interconnection networks, and, despite some additional implementation complexity, can be appealing for emerging network-on-chip designs that have an increasing number of connected processing elements. However, most existing adaptive procedures can rely on local congestion information (e.g., information readily available at a given router and at routers directly coupled to a given router) in making routing decisions and do not account for congestion in other areas of the network.

In order to increase the efficiency of on-chip networks, examples of computer-accessible mediums, systems and methods are described herein for adaptively determining status within a network, for example, congestion information of routers within a network. The computer-accessible mediums, systems and methods described herein can include determining status information regarding a first routing device located in the network and transmitting the status information to a second routing device provided in the network. The first routing device and the second routing device may be indirectly, or not directly, coupled to one another, e.g., the first routing device and the second routing device may be separated by intermediate nodes and may be coupled via a third routing device. Additionally, the second routing device can have a plurality of output channels that may be configured to route data through the network, and the data can be routed through a selected output channel based on the status information. In another example, the status information can be transmitted through a first group of communication channels in the network, and the data can be routed through a second group of communication channels in the network that is different from the first group. Examples of these configurations, as well as other configurations, are discussed in further detail below.

FIG. 1 is a block diagram of an illustrative example of a regional congestion awareness network, arranged in accordance with the present disclosure. The network can be a network-on-chip that can include a multinodal processor 103 comprising a multinodal processing array 102 fabricated on a single integrated circuit 100. In some examples, the single integrated circuit 100 may be configured to function as a CPU 101. In other examples, the multinodal processor 103 may include processors on separate integrated chips. The processing node array 102 can include a particular number (N) of processing nodes 104(1)-104(N). Any suitable number of processing nodes 104 may be provided. Each processing node 104(1)-104(N) can generally have any desired configuration including, but not limited to, a microprocessor (μP), a microcontroller (μC), a digital signal processor (DSP), or any combination thereof. Thus, each processing node 104(1)-104(N) can include logic for executing program instructions as well as other device blocks, such as e.g., an arithmetic logic unit (ALU), a floating point unit (FPU), a digital signal processing (DSP) node, registers, accumulators, etc.

In some examples, the multinodal processor 103 may function as a CPU 101, and may include any combination of dedicated or shared resources, some of which can be directly manufactured on the integrated circuit 100. A dedicated resource may be a resource 106 dedicated to a single processing node 104, such as a dedicated level one cache, and/or may be a resource 108 dedicated to any subset of the processing nodes 104. A shared resource may be a resource 110 shared by all of the nodes 104, such as a shared level two cache or a shared external bus 112 supporting an interface between the multinodal processor 103 and a secondary storage component 114, e.g., input-output (I/O) devices, external sensors, etc. and/or may be a resource shared by any subset of the processing nodes 104. The secondary storage component 114 may, or may not be directly accessible by the CPU 101. In other examples, the shared resource may also include a main memory 120 or some other primary storage device that may be directly accessible by the CPU 101, which can be any suitable form of memory (a storage device) including, but not limited to, volatile memory such as random access memory (RAM), non-volatile memory such as read only memory (ROM) or flash memory storage, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile.

The multinodal processor 100 may have any suitable number of processing nodes 104(1) to 104(N), each of which can contain its own respective data processing unit 115. For example, the multinodal processor 100 may have two (2) nodes, four (4) nodes, tens of nodes, and even hundreds or more of processing nodes. Some multinodal processors may be homogeneous, such that each of the processing nodes can use a single node design. Other multinodal processors may be heterogeneous, such that one or more of the processing nodes may be different from one or more of other processing nodes, and each node or subset of nodes may be optimized for a different role in the multinodal processor 103.

The multinodal processor 103 may also include a node/core controller 116. The node/core controller 116 may determine which processing tasks are to be processed by each processing unit 115 in the nodes 104(1)-104(N). In addition to the processing unit 115, each node 104 can contain a routing device 118, such as a router, switch or a combination of routers and switches, to route the various data packets between the individual nodes 104. In one example, the routers 118 can be coupled by communication channels 117 that are configured to route the data between the individual nodes 104 of the array 102. In another example, the communication channels 117 can also be used to route status information relating to the individual nodes 104 through the network. Alternatively, or in addition, the status information can be distributed to the individual nodes 104 through a separate network of communication channels 119 from the data network 117. In other examples, each router 118 can be coupled to the respective processing unit 115 within each node 104 by additional communication channels 121, 123 that are configured to route data between the router 118 and the respective processing unit 115.

FIG. 1 is a block diagram of an example of a multinodal processor, and does not illustrate the physical location of the components illustrated therein. It is appreciated that the multinodal processor 100 described herein is illustrative and that variations and modifications are possible. Design choices may be driven by, for example, considerations of hardware size and complexity versus performance, thermal energy and heat dissipation, processor speed, overall throughput, etc.

As may be appreciated by one skilled in the art having read the present disclosure, the multinodal processor 100 may be provided in a suitable computing environment, such as a personal computer (PC). A computing environment can include the multinodal processor 100, system memory, one or more buses, and one or more input/output (I/O) devices, such as a keyboard, mouse, touch screen, display device, such as a conventional CRT or LCD based monitor, universal serial bus (USB) or other port connections, CD drives, DVD drives, and the like. Bus connections among the various components may be implemented using bus protocols such as Peripheral Component Interconnect (PCI), PCI Express, Accelerated Graphics Port (AGP), or any other suitable bus protocol, and connections between different devices may use different protocols. A PC may operate in a networked environment using logical connections to one or more remote computers. Such remote computers may be, for example, other PCs, servers, routers, network PCs, peer devices, or other common network nodes. Logical connections may comprise, for example, a local-area network (LAN) or a wide-area network (WAN).

A block diagram of an example of a multinodal array in a regional congestion awareness network arranged in accordance with the present disclosure is illustrated by FIG. 2. As shown in FIG. 2, the nodes 104 of the multinodal array 102 can be arranged in a tiled configuration, with a small number of point-to-point wires coupled between the adjacent nodes 104. In particular, FIG. 2 illustrates an example of a two-dimensional mesh configuration consisting of sixteen (16) network nodes 104(1) to 104(16), each coupled by to a first group of data communication channels 201 configured to route the data packets between the individual nodes 104, which are shown as wide arrows, and a separate second group of communication channels 203 for routing information, such as congestion or status information, between the nodes 104, which are shown as narrow arrows. The groups of data and status communication channels 201 and 203 can be configured as (4) short wires.

Only one particular arrangement of a multinodal array is shown in FIG. 2 for clarification purposes, and other arrangements of communication channels and nodes can be used in conjunction with the regional congestion awareness network. For example, the nodes 104 can be arranged in a ring, a torus, or in a higher-order topology, such as a butterfly network. Additionally, the multinodal array 102 can include more or fewer communication channels, as well as shared communication channels linking multiple nodes 104 in the multinodal array 102. In other examples, the group of status communication channels 203 may have a lower bandwidth than the data communication channels 201. Furthermore, while the example multinodal array 102 illustrated in FIG. 2 transmits status information and data through separate networks, e.g., through two separate groups of data and status communication channels 201, 203, other examples of the regional congestion awareness network can transmit status information and data packets using the same network of communication channels.

In some examples, the status information transmitted through the status communication channels 203 can include congestion information or a congestion metric that can provide an indication as to the congestion of downstream nodes. In some additional examples, the congestion metric can include a count of free virtual channels, as described in an article by W. J. Dally and H. Aoki, "Deadlock-Free Adaptive Routing in Multicomputer Networks Using Virtual Channels," *IEEE Transactions on Parallel and Distributed Systems,* 4(4): 466-475, 1993, the entire disclosure of which is incorporated herein by reference. In other examples, the congestion metric can include a buffer count indicating the amount of backpressure experienced by an input channel at a downstream node, as described in an article by J. Kim, D. Park, T. Theocharides, N. Vijaykrishnan, and C. R. Das, "A Low Latency Router Supporting Adaptivity for On-Chip Interconnects," *International Conference on Design Automation,* pp. 559-564, 2005, the entire disclosure of which is also incorporated herein by reference. In another example, the congestion metric can include a crossbar demand metric, which measures the number of active data requests for a given output channel of the node. The crossbar demand metric can obtain the amount of channel multiplexing that the data packet may likely experience before being routed through an output channel. For example, multiple concurrent requests for a particular data output channel may suggest a convergent traffic pattern, indicating a bottleneck in the network. In other examples, multiple congestion metrics, including any of the metrics described above, can be combined so as to maximize the accuracy and quality of the determined status information.

As illustrated in the block diagram of the example of FIG. 2, status information can be distributed between various nodes 104 in the array 102 in different directions, such as North 229, South 231, East 233, and West 235 directions. For example, the router 118 in the node 104(11) can determine status information, which can be local status information, for each of its outgoing data channels 205, 207, 209, 211 based on locally available information at each data channel 205, 207, 209, 211. Additionally, the router 118 in the node 104(11) can receive non-local status information through status channels from directly coupled adjacent nodes 104(12), 104(15), 104(10), 104(7). In some examples, the router 118 in the node 104(11) can combine the local status information for the west outbound data channel 211 of the router 118 with the non-local status information received from the adjacent router 118 in the node 104(10). The combined status information can be sent through the east outbound status channel 213 of the router 118 in the node 104(11) to the router 118 in node 104(12), which is indirectly coupled to node 104(10). Similarly, the node 104(11) can combine its local status for its east outbound data channel 207 with non-local status information received from node 104(12) and pass the combined status information through its west outbound status channel 217 to node 104(10). In one example, the combined status information can be transmitted from the router of one node 104(11) to the router 118 of another node 104(12) in a single network hop 207, or without passing through any intermediate routing devices. This process can be performed for each node 104 in the array 102 along, e.g., each horizontal dimension, such as a horizontal direction 227 and/or each vertical dimension or direction 225 of the multinodal array 102, which can result in the propagation of congestion information through the multiple nodes 104 across the network.

Figure 3:
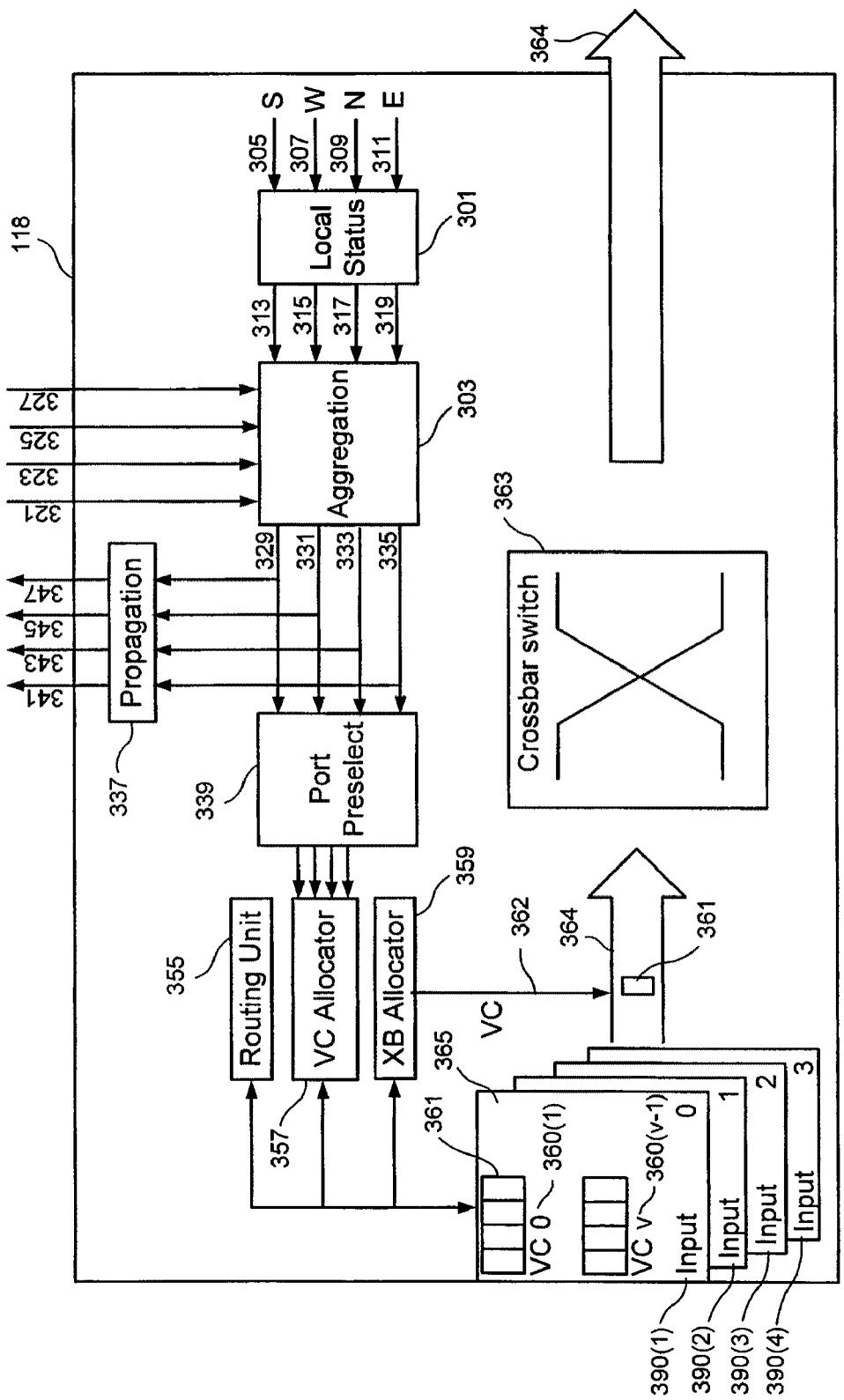
FIG. 3 is a block diagram of an illustrative example of a micro-architecture of an adaptive router operating in a regional congestion awareness network.

FIG. 3 is a block diagram of an illustrative example of a micro-architecture of an adaptive router 118 operating in the regional congestion awareness network, arranged in accordance with the present disclosure. As illustrated in the example of FIG. 3, each router 118 can contain a local status hardware unit/arrangement 301 configured to receive status information, which can be a local status information 305 to 311 for each outgoing channel of the router 118. As shown in the example illustrated in FIG. 2, the router 118 can have four (4) outgoing data channels 205 to 211 extending in the South 231, North 229, West 235, and East 233 directions. The local status hardware 301 may use the collected local status information 305 to 311 to determine local congestion metrics or statuses 313 to 319 for each of the outgoing data channels 205 to 211 based on the local status information 305 to 311.

Additionally, the router 118 can include a separate aggregation hardware unit/arrangement 303 that can receive non-local status information 321 to 327, which can be a non-local congestion status from each of the neighboring nodes 104, as well as the local congestion metrics 313 to 319 determined by the local status hardware unit arrangement 301. In some examples, the local congestion metrics 313 to 319 and the non-local status information 321 to 327 can be encoded in short, 6-bit integers, with a larger numerical value corresponding to a greater degree of traffic. As shown in FIG. 3, and in more detail in FIG. 4, the aggregation hardware arrangement can combine the local congestion metrics 313 to 319 with the non-local status information 321 to 327 to generate resulting combined status information or metrics 329 to 335 for each output channel of the router 118.

The router 118 may further have input channels 390(1) to 390(4), each comprising virtual channels 360(1) to 350($v$-1), for receiving data packets 361 from other routers in the array 102 (as shown in FIG. 2). The combined metrics 329 to 335 can be sent to a port preselection module 339 that compares the combined metrics 329 to 335 and preselects an output channel of the router 118, for example, output channel 364, from which to send the data packet 361 arriving from the input channels 390(1) to 390(4). In other examples, the combined metrics 329 to 335 can also be sent to a propagation module 337 that may process and send the combined metrics 329 to 335 through outgoing status communication channels 341 to 347 of the router 118 to further routers 118 of the adjacent nodes 104 in the multinodal array 102. Therefore, the congestion information relating to all of the available output channels of each router 118 can be obtained and distributed throughout the multinodal array 102 (shown in FIG. 2).

After the port preselection module 339 selects a particular output channel 364 for the outgoing data packet, a routing unit 355 and a virtual channel (VC) allocator 357 of the router 118 may process the outgoing data packet 361 to obtain a virtual channel, e.g., virtual channel 362, within the selected output channel 364 for routing the data packet 361. One method of selecting a virtual channel is described in detail in L. Peh and W. Dally, "A Delay Model and Speculative Architecture for Pipelined Routers," published in *International Symposium on High-Performance Computer Architecture*, pp. 255-266, 2001; and J. Kim, D. Park, T. Theocharides, N. Vijaykrishnan, and C. Das, "A Low Latency Router Supporting Adaptivity for On-Chip Interonnects," published in *Design Automation Conference*, pp. 559-564, 2005, the entire disclosures of which are each incorporated herein by reference. Upon a successful allocation of a virtual channel 362, the data packet 361 may enter a switch arbitration phase in crossbar (XB) allocator 359, where the packet 361 competes for the output port 364 with other packets from the router 118. Once a crossbar passage is granted, the data packet 361 traverses the crossbar switch 363, and enters the output channel 364.

Figure 4:
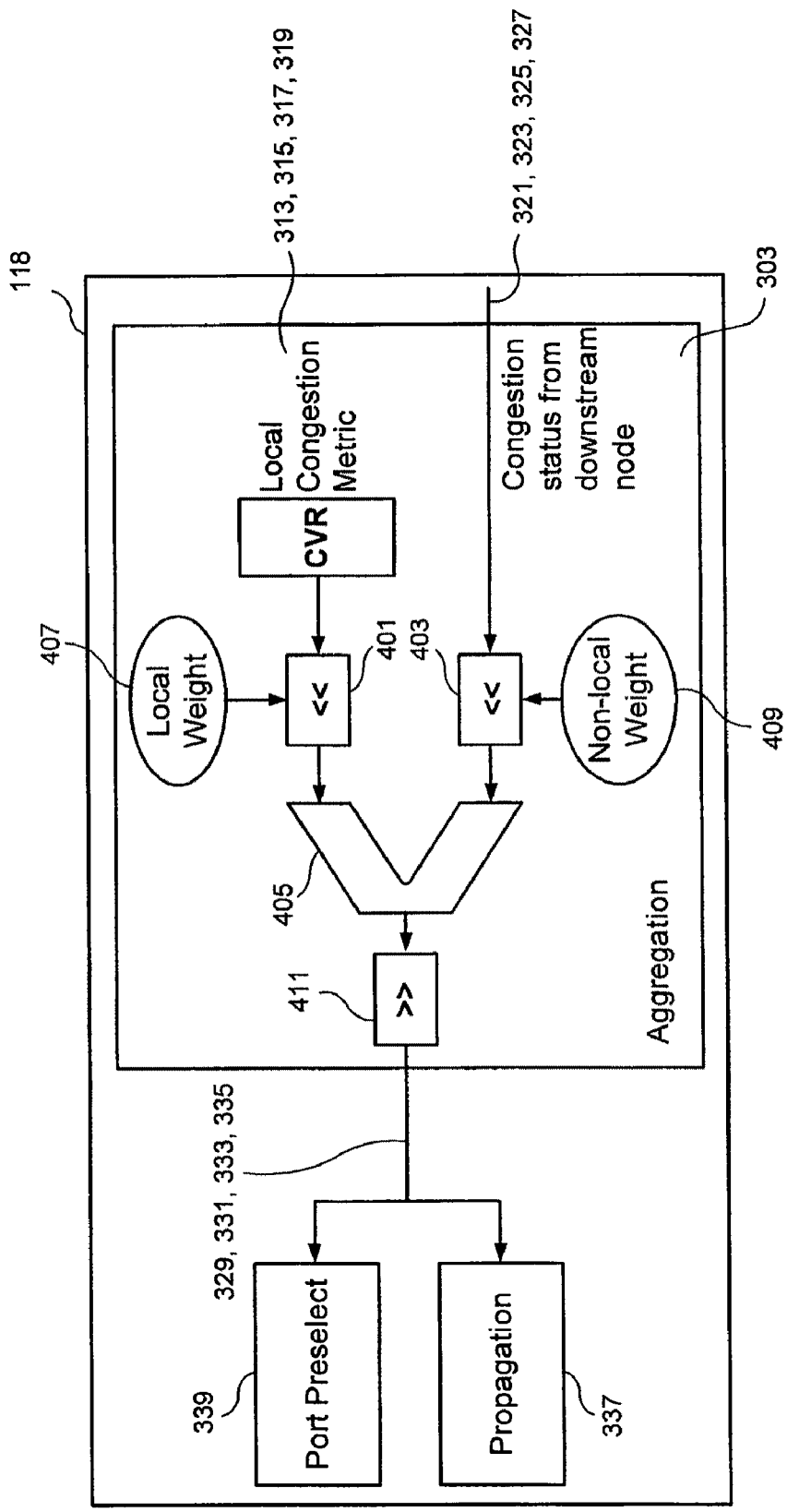
FIG. 4 is a schematic diagram of an illustrative example of an aggregation module in a regional congestion awareness network.

FIG. 4 is a schematic diagram of an illustrative example of an aggregation module 303 in a regional congestion awareness network, arranged in accordance with the present disclosure. In some examples, the aggregation module may include a software module that is executed by the aggregation hardware within the router 118, while in other examples the aggregation module is implemented as hardware. In some examples, the aggregation module 303 can receive the local congestion metrics 313 to 319 and the non-local status information 321 to 327 of the router 118, and can then left shift these values 401, 403 to ensure that the received congestion information 303 to 319 and 321 to 327 remains in the network for the distribution to other nodes 104 in subsequent network hops. The further the congestion information 303 to 319 and 321 to 327 is shifted to the left, the further the information 303 to 319 and 321 to 327 may travel through the multinodal array 102.

As illustrated in FIG. 4, the local congestion metrics 313 to 319 and the non-local status information 321 to 327 can be assigned separate weights before the combination thereof. In one example, the local congestion information 303 to 319 and the non-local status information 321 to 327 are assigned equal weights. In another example, different weights 407, 409 can be assigned to the local congestion metrics 313 to 319 and the non-local status information 321 to 327. The exact weighing of local and non-local congestion estimates can determine the dynamic behavior of the routing procedure. For example, placing more emphasis on local congestion information can make the network more locally adaptive, while placing too much weight on non-local data increases the risk of making routing decisions based on remote parts of the network that may be unreachable with minimal routing. The simplest assignment of weights, 50-50, can ensure that information from closer nodes is emphasized more than information from nodes located further downstream.

After weights 407, 409 are assigned to the local congestion metrics 313 to 319 and non-local status information 321 to 327, the aggregation module 303 can determine the arithmetic mean of the weighted local congestion metrics 313 to 319 and the weighted non-local status information 321 to 327 using an add function 405 and a right-shift function 411. The result of the aggregation module 303 can then be sent to the port preselection module 339 and to the propagation module 337 for transmission to other nodes 104 in the multinodal array 102.

FIG. 5 is a schematic diagram of an illustrative example of an aggregation module arrangement 303 within the regional congestion awareness network, arranged in accordance with the present disclosure. As illustrated in FIG. 5, the local congestion metric 313 to 319 and the non-local status information 321 to 327 of each output channel in the router 118 can be averaged by adding these values together using an add function 405(1)-(4), and then dividing by two (2) using a right shift by one operation 411(1)-(4). This approach weighs the local congestion metric 313 to 319 and the non-local status information 321 to 327 equally, and, as a result, can contribute a combined metric 329 to 335 that decays exponentially with distance from the router 118.

FIG. 6 is a schematic diagram of another example of the aggregation module arrangement 303 within the regional congestion awareness network. As illustrated in FIG. 6, the weights of the local congestion metric 313 to 319 and the non-local status information 321 to 327 can be adjusted by bit shifting before combination by the add functions 405(1)-(4) and averaging by a right shift by one operation 411(1)-(4). In this example, the non-local status information 321 to 327 can be given half as much weight as the local congestion metric 313 to 319 by right-shifting the non-local status information 321 to 327 by one position using a right-shift function 409 (1)-(4).

Figure 7A:
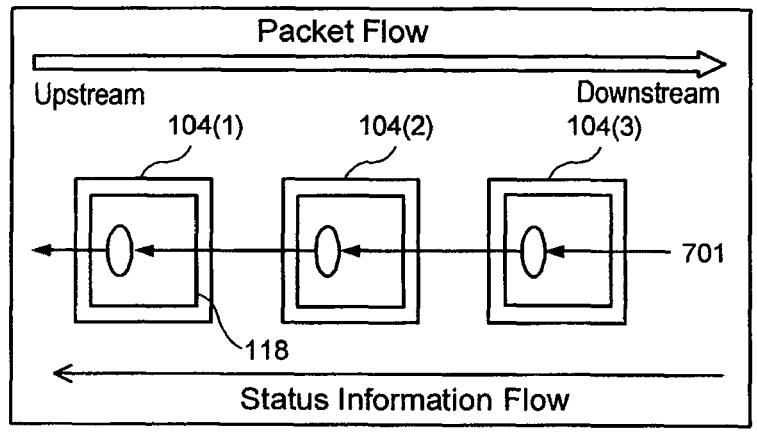
FIGS. 7a-7c are block diagrams of further examples of status information propagation procedures that can be used in conjunction with the regional congestion awareness networks.
Figure 7B:
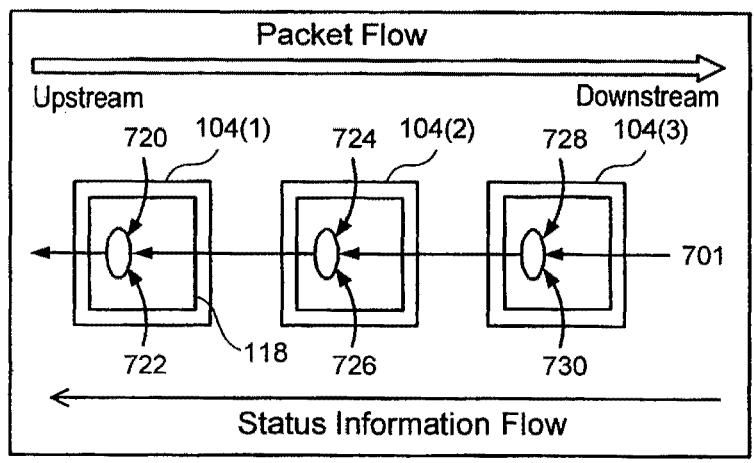
Figure 7B:
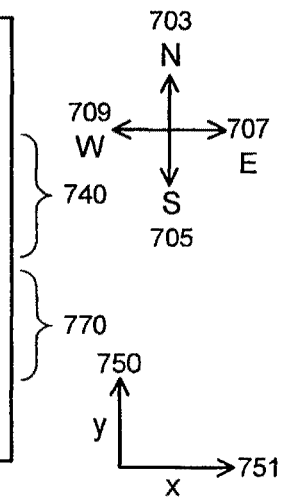
Figure 7C:
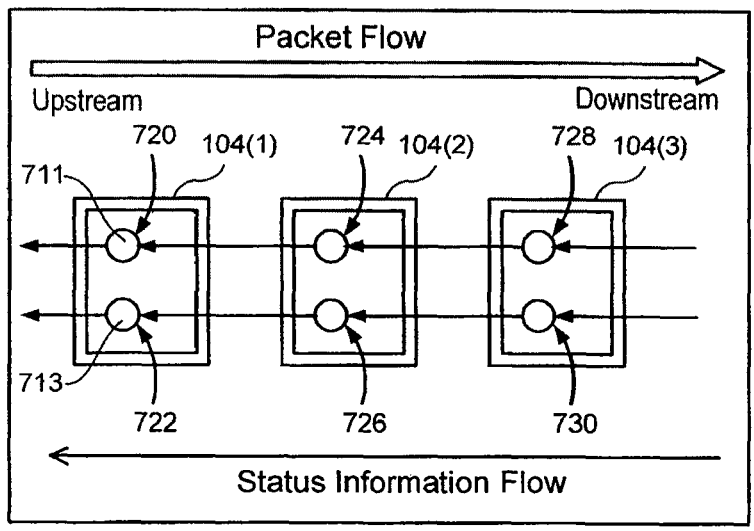

FIGS. 7a-7c are block diagrams of examples of status information propagation procedures that can be used in conjunction with the regional congestion awareness network, arranged in accordance with the present disclosure. As shown in FIG. 7a, the status information can be aggregated and propagated along a single axis of propagation 701, e.g., along each horizontal 751 or vertical 750 dimension of the multinodal array 102 (as shown in FIG. 2) independently. Also illustrated, the status information 701 is received, aggregated, and transmitted along the routing devices 118 of the nodes 104(1) to 104(3) of the multinodal array 102 in the West direction 709. In one example, status information and data information can be distributed through the array 102 (shown in FIG. 2) in different directions, for example, in West 709 and East 707 directions. The routers 118 can be located along a single dimension (e.g., dimension 705) of the array 102, which can simplify the implementation of the example configuration because status information is only aggregated and propagated along one dimension or direction 705 of the multinodal array 102.

In another example, the regional congestion awareness network can aggregate status information from an orthogonal set of vertical 750 and horizontal 751 dimensions of the array 102. As illustrated in FIG. 7b, status information from the routers 118 located along a vertical dimension 750 of the array 102 above the axis of propagation 701 can be aggregated and propagated in a South 705 direction, and status information from the routers 118 located along a vertical dimension 750 below the axis of propagation 701 can be aggregated and propagated in a North 703 direction. The aggregated status information 720, 724, 728 from the nodes located North 703 of the axis of propagation 701 can then be jointly aggregated with the aggregated status information 722, 726, 730 from nodes located South 705 of the axis of propagation 701 and the aggregated status information from nodes 104(1), 104(2), 104(3) located along the axis of propagation 701. In some examples, the total aggregated status information 760 from the North 703, South 705, and East 701 directions can be propagated along the West direction 709. This particular status information propagation procedure provides a more expansive view of congestion within the multinodal array 102, however, it combines information from separate routing quadrants (e.g., Northeast 740 and Southeast 770 quadrants), and therefore provides only a coarse view of congestion within the array. Furthermore, the implementation of this network is more complicated than that depicted in FIG. 7a, since the status information can be collected along multiple dimensions of the array 102.

FIG. 7c is another block diagram illustrating another example routing procedure that can be used in conjunction with the regional congestion awareness network. Similar to the example shown in FIG. 7b, the status information propagation procedure illustrated in FIG. 7c aggregates and propagates the status information along an orthogonal set of dimensions 750, 751 of the array 102. However, this variant aims to maximize the accuracy of the propagated status information by aggregating status information from the Northeast 740 and Southeast 770 quadrants of the array 102 separately. As illustrated in FIG. 7c, status information 720, 724, 728 from the routers 118 of the nodes located along a vertical dimension 750 of the array 102 above the axis of propagation 701 can be aggregated and propagated in a South 705 direction. The aggregated status information 720 can then be aggregated with status information collected along the axis of propagation 701 to obtain first aggregate status information 711 and propagated in a West direction 709. Similarly, the status information from the routers 118 of the nodes located below the axis of propagation 701 can be aggregated and propagated in a North direction 703, and the aggregated status information 722 can be separately aggregated with information collected along the axis of propagation 701 to obtain a second aggregate status information 713. This configuration of the regional congestion awareness network can improve the accuracy of congestion estimates by maintaining separate first and second aggregate status information 711, 713 for each quadrant of the network 740, 770, but is more complicated to implement because separate status information 711, 713 must be received, updated and propagated for each output channel of the router 118.

FIGS. 8a-8c are schematic diagrams of examples of propagation modules in the example regional congestion awareness networks shown in FIGS. 7a-7c, arranged in accordance with the present disclosure. As illustrated in FIG. 8a, the routing procedure shown in FIG. 7a does not require the presence of a propagation module, since no modification of the combined metrics 329 to 333 is necessary. Instead, the combined metrics 329 to 333 can be directly propagated in an upstream direction (e.g., from East 707 to West 709, as shown in FIG. 7a).

FIG. 8b is a schematic diagram illustrating an example propagation module for the example of the regional congestion awareness network shown in FIG. 7b. At a high level, a data packet arriving at a given input port can leave toward one of two quadrants. For example, a data packet arriving through a West input channel of a router 118 may route to either the Northeast or Southeast quadrants through data output channels in either the North 703, South 705 or East 707 directions. However, the probability of selecting an East outgoing data channel is higher than the probability of selecting either a North output channel or a South output channel. The propagation module 337 can account for this effect by weighing the received combined congestion metric for the straight-line path 335 (e.g., from West 709 to East 707, as shown in the example illustrated in FIG. 8b) two (2) times more than the received combined metrics 331 and 329 of each of the other possible output channels (e.g. data output channels in the North 703 and South 705 directions). To implement this effect, the propagation module 337 can include a first adding function 801 and a first right-shift function 803 for averaging the combined metrics 331 and 329 correlating to the orthogonal data output channels in the North 703 and South 705 directions, as well as a second adding function 805 and a second right-shift function 807 for combining the computed average 806 with the combined metric 333 correlating to the West-side data output channel, thereby creating the desired weight distribution.

FIG. 8c is a schematic diagram showing an example of a propagation module for the example of the regional congestion awareness network illustrated in FIG. 7c. In this example, only one adder 809 and one shifter 811 are needed to average the combined metrics 331, 333 for the output channels (e.g. data output channels in the North 703 and West 709 directions) bounding a given quadrant (e.g., Northwest).

Figure 9:
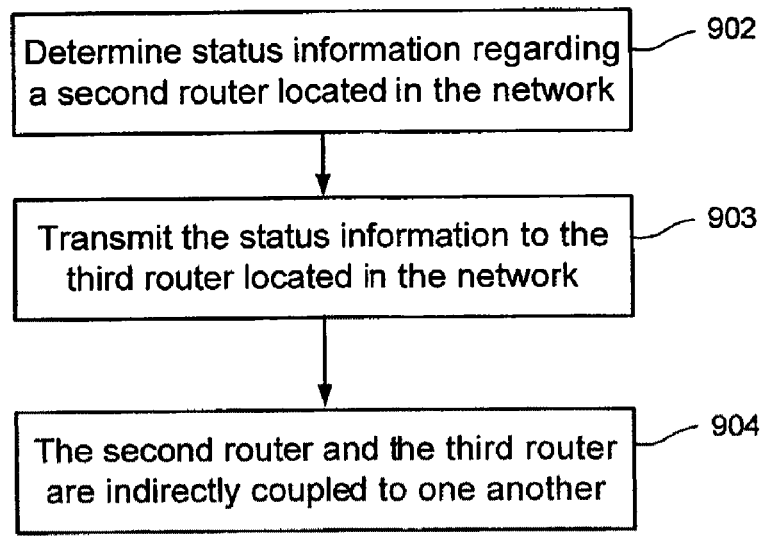
FIG. 9 is an example flow diagram of a method for adaptively determining status within a network.

FIG. 9 is an example flow diagram of a method for adaptively determining status within a network that includes a first router, a second router and a third router, in accordance with the present disclosure. The method for the first router may comprise determining status information regarding a second router located in the network, as shown in block 902. In block 903, the status information may be transmitted to a third router located in the network. In block 904, the second router and the third router can be indirectly coupled to one another.

Figure 10:
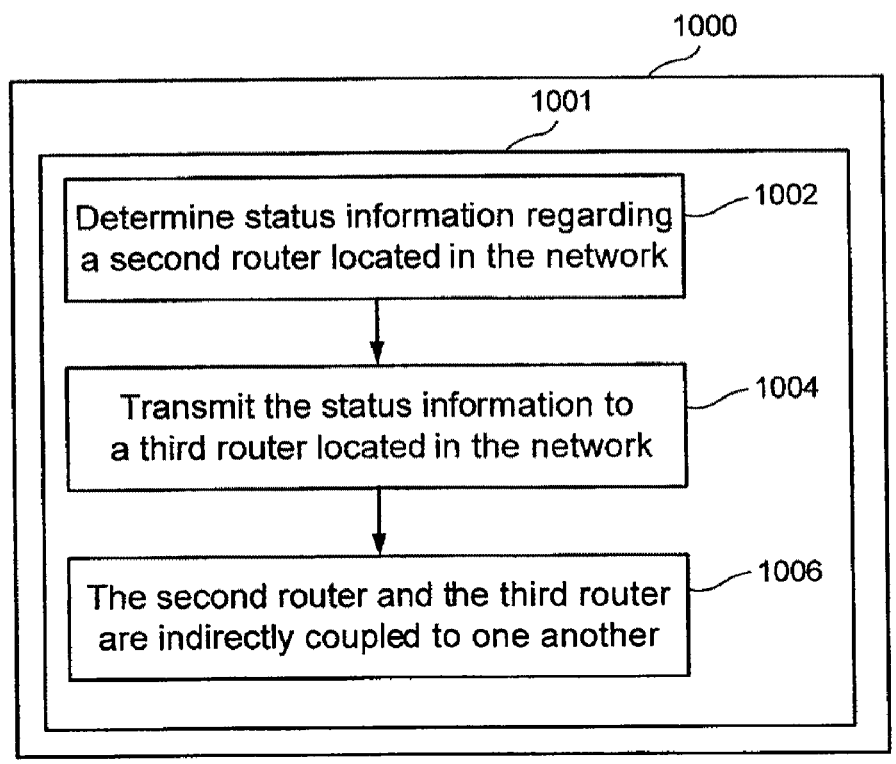
FIG. 10 is an example block flow diagram of a computer-accessible medium and/or a computer system which includes software thereon for determining status within a network, all arranged in accordance with the present disclosure.

FIG. 10 is an example block flow diagram of a computer-accessible medium and/or a computer system which includes software thereon for determining status within a network, arranged in accordance with the present disclosure. For this particular example, a computer system 1000 may include a processor 1001, for example a CPU 101 as shown in FIG. 1, having a first router configured for performing an example of a method for adaptively determining status within a network. In other examples, various steps or portions of various steps of the method may be performed outside of the processor 1001. In block 1002, the method may include determining status information regarding a second router located in the network. In block 1004, the method may include transmitting the status information to a third router located in the network. In block 1006, the second router and the third router can be indirectly coupled to one another.

Figure 11:
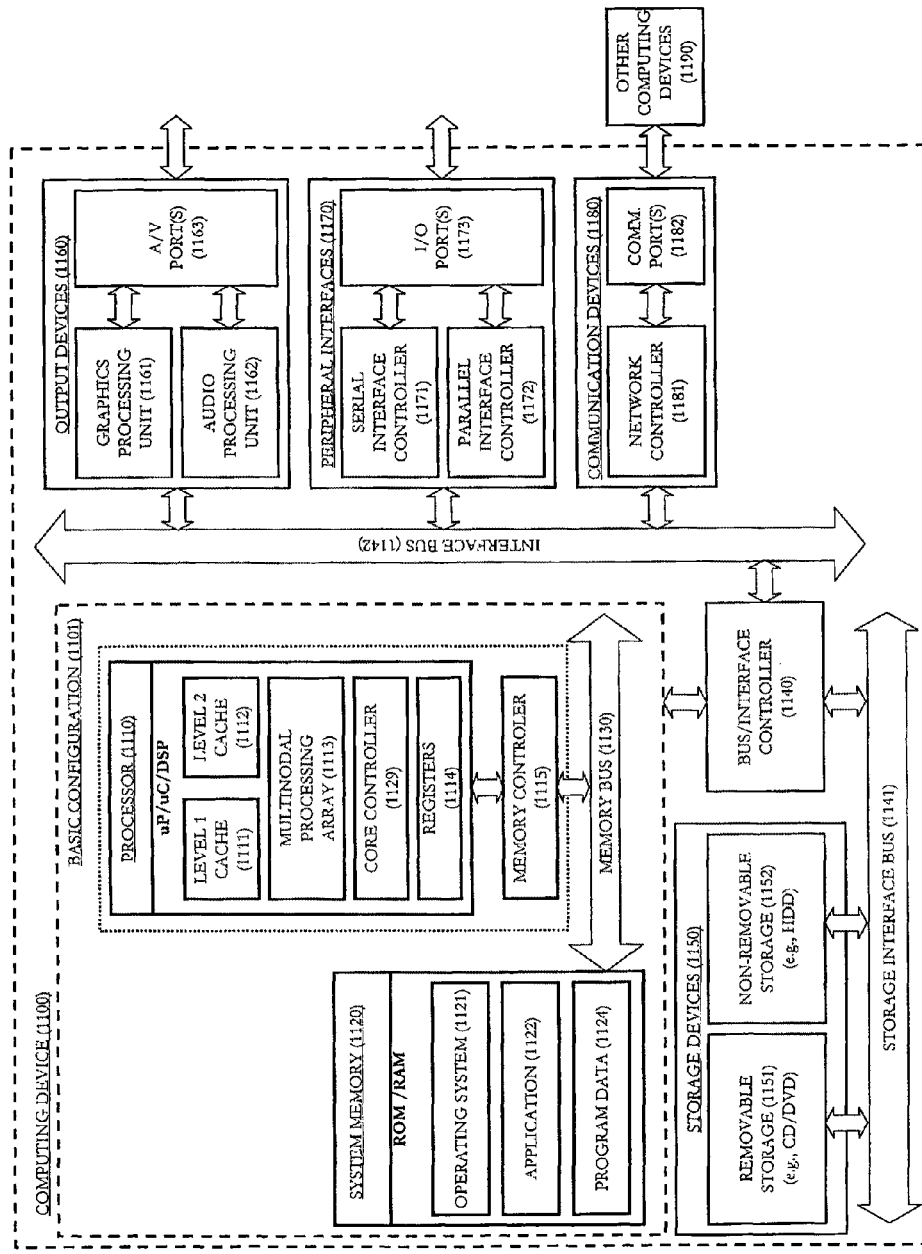
FIG. 11 is a block diagram of an example of a computing device that is arranged for regional congestion awareness.

FIG. 11 is a block diagram illustrating an example computing device 1100 that is arranged for regional congestion awareness in accordance with the present disclosure. In a very basic configuration 1101, computing device 1100 typically includes one or more processors 1110 and system memory 1120. A memory bus 1130 can be used for communicating between the processor 1110 and the system memory 1120.

Depending on the desired configuration, processor 1110 can be of any type including but not limited to a microprocessor (µP), a microcontroller (µC), a digital signal processor (DSP), or any combination thereof. Processor 1110 can include one more levels of caching, such as a level one cache 1111 and a level two cache 1112, and registers 1114. Processor 1110 may further include a multinodal processing array 1113 that is arranged to adaptively determine status in a network. The multinodal processing array 1113 can include an arithmetic logic unit (ALU), a floating point unit (FPU), a digital signal processing core (DSP Core), or any combination thereof. A memory controller 1115 can also be used with the processor 1110, or in some implementations the memory controller 1115 can be an internal part of the processor 1110. The processor 1110 may further comprise a node/core controller 1129 that may determine the processing tasks processed by the multinodal processing array 1113.

Depending on the desired configuration, the system memory 1120 can be of any type including but not limited to volatile memory (such as RAM), non-volatile memory (such as ROM, flash memory, etc.) or any combination thereof. System memory 1120 typically includes an operating system 1121, one or more applications 1122, and program data 1124. In some embodiments, application 1122 can be arranged to operate with program data 1124 on an operating system 1121. This described basic configuration is illustrated in FIG. 11 by those components within dashed line 1101.

Computing device 1100 can have additional features or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include an interface bus 1142 for facilitating communication from various interface devices (e.g., output interfaces, peripheral interfaces, and communication interfaces) to the basic configuration 1101 via the bus/interface controller 1140. Example output devices 1160 include a graphics processing unit 1161 and an audio processing unit 1162, which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173. An example communication device 1180 includes a network controller 1181, which can be arranged to facilitate communications with one or more other computing devices 1190 over a network communication via one or more communication ports 1182.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

The foregoing describes various examples of systems and methods for adaptively determining status within a network. Specific examples of methods and systems for adaptively determining status within a network are described below. These are for illustration only and are not intended to be limiting.

The present disclosure generally relates to systems and methods adaptively determining status within a network. In one example of a method for a first router to adaptively determine status within a network, the network may include the first router, a second router and a third router. The method for the first router may comprise determining status information regarding the second router located in the network, and transmitting the status information to the third router located in the network. The second router and the third router may be indirectly coupled to one another.

In some examples, the third router may have a plurality of output channels configured to route data through the network, and the data may be routed through a selected output channel of the third router based on the status information. In additional examples, the status information may be transmitted through a first group of communication channels in the network, and the data may be routed via a second group of communication channels in the network, which can be different from the first group. In further examples, the determining step can include obtaining local status information regarding the first router and non-local status information regarding the second router, and combining the local status information and the non-local status information. In other examples, the first and second routers may be directly coupled to one another and the first and third routers may be directly coupled to one another.

The present disclosure also relates to computer accessible mediums having stored thereon computer executable instructions for performing a procedure to adaptively determine status in a network. The procedure may be executed by a processing arrangement provided in a first router, and the processing arrangement may be configured to perform techniques comprising determining status information regarding a second router located in the network, and transmitting the status information to a third router located in the network. The second router and the third router may be indirectly coupled to one another.

In other examples, the third router may have a plurality of output channels being configured to route data through the network, and the data may be routed through a selected output channel of the third router based on the status information.

The present disclosure also relates to apparatuses for adaptively determining status in a network. In one example, the apparatus may include at least a first router and a second router. The apparatus may comprise a particular router located in the network coupled to the first router located in the network. The particular router may be configured to determine status information regarding the first router in the network and transmit the status information to the second router that is indirectly coupled to the first router.

In other examples, the second router may have a plurality of output channels being configured to route data through the network, and the data may be routed through a selected output channel of the second router based on the status information. In addition, the first, second, and particular routers may be located along a single dimension of the network. In further examples, the network may be a network-on-chip. In addition, the status information may be transmitted through a first group of communication channels in the network, and the data may be routed via a second group of communication channels in the network that is different from the first group.

In further examples of apparatuses, the status information may be determined by obtaining local status information regarding the particular router located in the network and non-local status information regarding the first router located in the network, and combining the local status information and the non-local status information. Additionally, the first router may be coupled to the second router via another router. Furthermore, the status information may include congestion information. In other examples, a first weighted value may be assigned to the non-local status information and a second weighted value may be assigned to the local status information before combining the local status information and the non-local status information.

In other examples, the apparatuses may further comprise a third router located in the network coupled to a fourth router located in the network. The third router may be configured to determine further status information regarding the fourth router and transmit the further status information to the second router. The fourth router may be indirectly coupled to the second router, and the third and fourth routers may be located along a dimension of the network that is different from the dimension of the network containing the first, second and particular routers. In some examples, the apparatuses may further comprise a fifth router located in the network coupled to a sixth router located in the network. The fifth router may be configured to determine second further status information regarding the sixth router and transmit the second further status information to the second router. The sixth router may be indirectly coupled to the second router, and the fifth, sixth, third and fourth routers may be located along a single dimension of the network that is orthogonal to the dimension containing the first, second and particular routers. The third and fifth routers may be located on opposite sides of the dimension containing the first, second and particular routers.

In additional examples, the status information, further status information, and second further status information may be combined to generate aggregate status information, and the output channel of the second router may be selected based on the aggregate status information. In other examples, the status information and the further status information may be combined to produce first aggregate status information, the status information and second further status information may be combined to produce second aggregate status information, and the output channel of the second router can be selected based on the first and second aggregate status information.

The present disclosure is not to be limited in terms of the particular examples described in this application, which are intended as illustrations of various aspects. Many modifications and variations can be made without departing from its spirit and scope, as will be apparent to those skilled in the art. Deviceally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more devices and/or operations, it will be understood by those within the art that each device and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same deviceality. In a conceptual sense, any arrangement of components to achieve the same deviceality is effectively "associated" such that the desired deviceality is achieved. Hence, any two components herein combined to achieve a particular deviceality can be seen as "associated with" each other such that the desired deviceality is achieved, irrespective of architectures or intermedial components. Likewise, any two components so associated can also be viewed as being "operably connected," or "operably coupled," to each other to achieve the desired deviceality, and any two components capable of being so associated can also be viewed as being "operably couplable," to each other to achieve the desired deviceality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for adaptively determining status in a network, which includes at least a first router and a second router, the apparatus comprising:
a particular router located in the network coupled to the first router located in the network and to the second router located in the network, the particular router being configured to provide aggregate status information to the second router that is indirectly coupled to the first router, wherein the second router has a plurality of output channels configured to route data through the network and wherein the data is routed through a selected output channel based at least in part on the aggregate status information, wherein the aggregate status information is determined by obtaining a local status information regarding the particular router located in the network including a local congestion metric and a non-local status information regarding the first router located in the network, wherein the particular router includes an aggregation hardware unit configured to mathematically combine the local congestion metric and the non-local status information to generate the aggregate status information, wherein the aggregation hardware unit is configured to perform an add function and a right-shift function, and wherein a first weight is assigned to the non-local status information and a second weight is assigned to the local status information before combining the local congestion metric and the non-local status information in accordance with the first and second weights.

2. The apparatus of claim 1, wherein the first, second, and particular routers are located along a single dimension of the network.

3. The apparatus of claim 1, wherein the network is a network-on-chip.

4. The apparatus of claim 1, wherein the aggregate status information is transmitted through a first group of communication channels in the network, and the data is routed via a second group of communication channels in the network that is different from the first group.

5. The apparatus of claim 1, further comprising a third router located in the network coupled to a fourth router located in the network, the third router being configured to determine further status information regarding the fourth router and transmit the further status information to the second router, wherein the fourth router is indirectly coupled to the second router, and wherein the third and fourth routers are located along a dimension of the network that is different from the dimension of the network containing the first, second and particular routers.

6. The apparatus of claim 5, further comprising a fifth router located in the network coupled to a sixth router located in the network, the fifth router being configured to determine second further status information regarding the sixth router and transmit the second further status information to the second router, wherein the sixth router is indirectly coupled to the second router, and wherein the fifth, sixth, third and fourth routers are located along a single dimension of the network that is orthogonal to the dimension containing the first, second and particular routers, and wherein the third and fifth routers are located on opposite sides of the dimension containing the first, second and particular routers.

7. The apparatus of claim 6, wherein the aggregate status information is based, at least in part, on the further status information and the second further status information.

8. The apparatus of claim 6, wherein the local congestion metric and second further status information are combined to produce second aggregate status information, and the output channel of the second router is selected based on the first and second aggregate status information.

9. The apparatus of claim 1, wherein the local congestion metric comprises an integer having a value corresponding to a degree of traffic.

10. The apparatus of claim 1, wherein the local congestion metric includes a count of free virtual channels.

11. The apparatus of claim 1, wherein the local congestion metric includes a crossbar demand metric.

12. An apparatus for adaptively determining status in a network, which includes at least a first router and a second router, the apparatus comprising:
a particular router located in the network coupled to the first router located in the network and to the second router located in the network, the particular router being configured to provide aggregate status information to the second router that is indirectly coupled to the first router, wherein the second router has a plurality of output channels configured to route data through the network and wherein the data is routed through a selected output channel based at least in part on the aggregate status information, wherein the aggregate status information is determined by obtaining a local status information regarding the particular router located in the network including a local congestion metric and a non-local status information regarding the first router located in the network, wherein the local congestion metric comprises an integer having a value corresponding to a degree of traffic, wherein the particular router includes an aggregation hardware unit configured to mathematically combine the local congestion metric and the non-local status information to generate the aggregate status information, wherein the aggregation hardware unit is configured to left shift the local congestion metric and the non-local status information, and wherein a first weight is assigned to the non-local status information and a second weight is assigned to the local status information before combining the local congestion metric and the non-local status information in accordance with the first and second weights.

13. An apparatus for adaptively determining status in a network, which includes at least a first router and a second router, the apparatus comprising:

a particular router located in the network coupled to the first router located in the network and to the second router located in the network, the particular router being configured to provide aggregate status information to the second router that is indirectly coupled to the first router, wherein the second router has a plurality of output channels configured to route data through the network and wherein the data is routed through a selected output channel based at least in part on the aggregate status information, wherein the aggregate status information is determined by obtaining a local status information regarding the particular router located in the network including a local congestion metric and a non-local status information regarding the first router located in the network, wherein the particular router includes an aggregation hardware unit configured to mathematically combine the local congestion metric and the non-local status information to generate the aggregate status information, wherein the aggregation hardware unit is configured to determine an arithmetic mean of the local congestion metric and the non-local status information, and wherein a first weight is assigned to the non-local status information and a second weight is assigned to the local status information before combining the local congestion metric and the non-local status information in accordance with the first and second weights.

* * * * *

UNITED STATES PATENT AND TRADEMARK OFFICE
CERTIFICATE OF CORRECTION

PATENT NO. : 8,285,900 B2
APPLICATION NO. : 12/372556
DATED : October 9, 2012
INVENTOR(S) : Gratz et al.

Page 1 of 2

It is certified that error appears in the above-identified patent and that said Letters Patent is hereby corrected as shown below:

On Page 2, in Field (56), under "OTHER PUBLICATIONS", in Column 2, Line 5, delete "2007. (CCWMSNO7)." and insert -- 2007, (CCWMSNO7), --, therefor.

On Page 2, in Field (56), under "OTHER PUBLICATIONS", in Column 2, Line 9, delete "1998. LCN'98." and insert -- 1998, LCN'98, --, therefor.

On Page 2, in Field (56), under "OTHER PUBLICATIONS", in Column 2, Line 12, delete "al.;" and insert -- al., --, therefor.

On Page 2, in Field (56), under "OTHER PUBLICATIONS", in Column 2, Line 13, delete "Networks"" and insert -- Networks," --, therefor.

On Page 2, in Field (56), under "OTHER PUBLICATIONS", in Column 2, Line 15, delete "Networks"" and insert -- Networks," --, therefor.

On Page 2, in Field (56), under "OTHER PUBLICATIONS", in Column 2, Line 16, delete "al.;" and insert -- al., --, therefor.

On Page 2, in Field (56), under "OTHER PUBLICATIONS", in Column 2, Line 17, delete "Networks"" and insert -- Networks," --, therefor.

On Page 2, in Field (56), under "OTHER PUBLICATIONS", in Column 2, Line 18, delete "al.;" and insert -- al., --, therefor.

On Page 2, in Field (56), under "OTHER PUBLICATIONS", in Column 2, Line 19, delete "Networks"" and insert -- Networks," --, therefor.

On Page 2, in Field (56), under "OTHER PUBLICATIONS", in Column 2, Line 21, delete "Torus"" and insert -- Torus," --, therefor.

Signed and Sealed this
Twelfth Day of March, 2013

Teresa Stanek Rea
*Acting Director of the United States Patent and Trademark Office*

CERTIFICATE OF CORRECTION (continued)
U.S. Pat. No. 8,285,900 B2

On Page 2, in Field (56), under "OTHER PUBLICATIONS", in Column 2, Line 22, delete "Arjun.;" and insert -- Arjun; --, therefor.

On Page 2, in Field (56), under "OTHER PUBLICATIONS", in Column 2, Line 22, delete "Tori"" and insert -- Tori," --, therefor.

On Page 2, in Field (56), under "OTHER PUBLICATIONS", in Column 2, Line 24, delete "Arjun.; Adaptive" and insert -- Arjun; "Adaptive --, therefor.

On Page 2, in Field (56), under "OTHER PUBLICATIONS", in Column 2, Line 24, delete "n-cubes" and insert -- n-cubes," --, therefor.

On Page 2, in Field (56), under "OTHER PUBLICATIONS", in Column 2, Line 26, delete "Jongman.;" and insert -- Jongman; --, therefor.

On Page 2, in Field (56), under "OTHER PUBLICATIONS", in Column 2, Line 27, delete "Interconnects"" and insert -- Interconnects," --, therefor.

On Page 2, in Field (56), under "OTHER PUBLICATIONS", in Column 2, Line 28, delete "al.;" and insert -- al., --, therefor.

On Page 2, in Field (56), under "OTHER PUBLICATIONS", in Column 2, Line 29, delete "Routers"" and insert -- Routers," --, therefor.

On Page 2, in Field (56), under "OTHER PUBLICATIONS", in Column 2, Line 30, delete "High-Perfomance" and insert -- High-Performance --, therefor.

In Fig. 11, Sheet 10 of 10, below "PROCESSOR (1110)", in Line 1, delete "uP/uC/DSP" and insert -- $\mu P/\mu C$/DSP --, therefor.

In Fig. 11, Sheet 10 of 10, in Box "(1115)", in Line 1, delete "CONTROLER" and insert -- CONTROLLER --, therefor.

In Column 7, Line 65, delete "Interonnects,"" and insert -- Interconnects," --, therefor.